United States Patent
Park

(10) Patent No.: US 7,770,983 B2
(45) Date of Patent: Aug. 10, 2010

(54) DAMPING FORCE CONTROL VALVE AND SHOCK ABSORBER USING THE SAME

(75) Inventor: Kyu Shik Park, Seoul (KR)

(73) Assignee: Mando Corporation, Seoul (KR)

( * ) Notice: Subject to any disclaimer, the term of this patent is extended or adjusted under 35 U.S.C. 154(b) by 741 days.

(21) Appl. No.: 11/709,341

(22) Filed: Feb. 20, 2007

(65) Prior Publication Data

US 2007/0227843 A1 Oct. 4, 2007

(30) Foreign Application Priority Data

Feb. 20, 2006 (KR) .................. 10-2006-0016095

(51) Int. Cl.
*B60T 8/38* (2006.01)

(52) U.S. Cl. ............... 303/117.1; 188/266; 188/282.3; 188/282.5; 188/313

(58) Field of Classification Search ............. 303/117.1, 303/20; 188/266.6, 322.2, 322.13, 310, 313, 188/314, 317, 278, 282.2, 282.3, 282.5, 282.8, 188/266

See application file for complete search history.

(56) References Cited

U.S. PATENT DOCUMENTS

| | | | |
|---|---|---|---|
| 5,085,299 A | | 2/1992 | Spiess et al. |
| 5,934,421 A | * | 8/1999 | Nakadate et al. ......... 188/299.1 |
| 6,000,508 A | | 12/1999 | Forster |
| 6,079,526 A | * | 6/2000 | Nezu et al. ............... 188/266.6 |
| 6,155,391 A | * | 12/2000 | Kashiwagi et al. ....... 188/266.6 |
| 6,182,805 B1 | * | 2/2001 | Kashiwagi et al. ....... 188/266.6 |
| 7,273,138 B2 | * | 9/2007 | Park .......................... 188/322.2 |
| 7,604,101 B2 | * | 10/2009 | Park .......................... 188/322.2 |
| 2005/0167216 A1 | | 8/2005 | Park |

FOREIGN PATENT DOCUMENTS

| | | |
|---|---|---|
| EP | 0504624 A2 | 9/1992 |
| JP | 09-126263 A | 5/1997 |
| JP | 11-094004 A | 4/1999 |
| JP | 2001-012534 A | 1/2001 |
| JP | 2002-013582 A | 1/2002 |
| JP | 2004-263752 A | 9/2004 |
| JP | 2006-038097 A | 2/2006 |

* cited by examiner

*Primary Examiner*—Pam Rodriguez
(74) *Attorney, Agent, or Firm*—McDermott Will & Emery LLP

(57) ABSTRACT

A damping force control valve, which includes a high pressure region in communication with a tension chamber of a cylinder and a low pressure region in communication with a reservoir chamber, and controls a damping force by adjusting pressure of a pilot chamber by first and second variable orifices, the first and second variable orifices having channels controlled to open or close by a spool. The damping force control valve comprises a main valve opened or closed according to pressure of the high pressure region, initial preload and pressure of the pilot chamber, the main valve allowing working fluid to flow from the high pressure region to the low pressure region when being opened; a first fixed orifice formed between the high pressure region and the first variable orifice; and a back pressure forming channel for making the first fixed orifice and the pilot chamber communicate with each other.

4 Claims, 7 Drawing Sheets

DAMPING FORCE CONTROL VALVE AND SHOCK ABSORBER USING THE SAME

BACKGROUND OF THE INVENTION

1. Field of Invention

The present invention relates to a damping force control valve and a shock absorber using the same, and more particularly, to a damping force control valve having an orifice installed to an inlet of a pilot channel to give a high-speed damping force when a shock absorber is operated in a soft mode, and a shock absorber using the same.

2. Description of the Prior Art

Generally, a shock absorber of a vehicle is installed to a moving means such as a car, and thus, absorbs or buffers vibrations or shocks transferred from road wheels in contact with a road surface.

This shock absorber can improve the ride comfort by lowering a damping force and thus absorbing vibrations caused by unevenness of a road surface when a vehicle is ordinarily running, and enhance the handling stability by raising a damping force and thus restraining posture change of the vehicle body when the vehicle turns, accelerates, brakes or runs at high speed.

Meanwhile, in order to improve the ride comfort and handling stability, a shock absorber is recently provided with a damping force control valve mounted to one side thereof so as to suitably adjust a damping force, so that it is developed up to a damping force control shock absorber capable of suitably controlling a damping force according to a road surface state a the running state.

In general, most of conventional damping force control shock absorbers control a damping force in an actuator manner, and are mainly classified into a reverse type and a normal type depending on a damping force control method.

The aforementioned damping force control shock absorber is configured to increase or decrease both rebound and compressing damping forces at the same time according to an actuator current. For example, the conventional damping force control shock absorber controls a damping force in rebound and compression strokes in a soft mode by application of a certain actuator current, and also controls the damping force in a hard mode by application of a higher actuator current. Such damping force control is realized in such a manner that a spool moving according to the actuator operation controls back pressure formation in and adjustment of a pilot chamber formed in the rear of the damping force control valve.

FIG. 1 is a sectional view showing a conventional damping force control valve of a shock absorber.

A conventional damping force control valve 10 includes a spool rod 20 installed to an upper portion of an actuator 15 and having a plurality of channels allowing fluid communication, and a spool 25 installed to the spool rod 20 and operated by the actuator 15 to open and close each channel, as shown in FIG. 1.

In addition, a first ring disk 32 acting as a fixed orifice is installed to the spool rod 20, and a lower retainer 34 having a communication port 34a allowing fluid flow is installed to an upper portion of the first ring disk 32.

Also, a second ring disk 36 acting as a main valve is installed to an upper portion of the lower retainer 34. The second ring disk 36 partitions a pilot chamber 45 formed in the upper portion of the lower retainer 34 from a high pressure region Ph. In addition, an upper retainer 38 having a communication port 38a allowing fluid flow is installed over the lower retainer 34.

Then, a nut 27 is coupled to the spool rod 20 to join the lower retainer 34 and the upper retainer 38. Meanwhile, a spring 23 is interposed between one end of the spool rod 20 and the spool 25, so that the spool 25 is brought into close contact with to the actuator 15.

The spool 25 has a hollow portion (not shown) and a plurality of vertically stepped outer diameters. Here, an upper spool slit 25a and a lower spool slit 25b are defined by the stepped outer diameters of the spool 25. At this time, the upper spool slit 25a is formed to be larger than the lower spool slit 25b, so that when the spool 25 reciprocates, the area change of the upper spool slit 25a with respect to the communication ports 21a, 21b and 21c of the spool rod 20 is greater than that of the lower spool slit 25b with respect to the communication port 34a of the spool rod 20.

Referring to FIG. 2, which is a schematic hydraulic circuit diagram showing a channel in the conventional damping force control valve, the operation of the conventional damping force control valve 10 so configured will be explained.

As mentioned above, the damping force control valve 10 includes a first channel Qm having a main valve Km, a second channel Qr having a first variable orifice Kr, and a third channel Qc having a second variable orifice Kv and a fixed orifice Kc.

In the damping force control valve 10, the movement of the spool 25 controls the flow of the fluid that moves from a high pressure region Ph to a low pressure region Pl. When the spool 25 moves as mentioned above, open areas of the first variable orifice Kr and the second variable orifice Kv are varied.

At this time, the first variable orifice Kr has an area change ratio greater than that of the second variable orifice Kv, and allows fluid to flow from the high pressure region Ph to the low pressure region Pl. Here, the area of the first variable orifice Kr is decreased as that of the second variable orifice Kv is increased, while the area of the first variable orifice Kr is increased as that of the second orifice Kv is decreased.

The first channel Qm determines a valve characteristic in a middle high speed range of the soft/hard mode and has a spring preload in the form of a relief valve. Also, the pilot chamber 45 is formed in a rear surface of the valve and thus its pressure determines a valve opening pressure, thereby making the damping force control possible.

In addition, the main valve Km is opened at different pressures according to a pressure Pc of the pilot chamber 45. The pressure Pc of the pilot chamber 45 is formed by the operation of the second variable orifice Kv installed in an upstream of the third channel Qc and the fixed orifice Kc installed in a downstream. Thus, the pressure of the pilot chamber 45 increases by controlling the area of the second variable orifice Kv, whereby the damping force characteristic is converted into the hard mode.

At this time, the sectional area of the second variable orifice Kv is decreased as that of the first variable orifice Kr is increased, while the sectional area of the second variable orifice Kv is increased as that of the first variable orifice Kr is decreased.

In addition, the second channel Qr determines a low-speed damping force characteristic in the soft mode, and its area is changed by the first variable orifice Kr to determine a damping force.

Also, the third channel Qc is configured such that the second variable orifice Kv is installed to its inlet and the fixed orifice Kc is installed to its exit so as to form a pressure of the pilot chamber 45.

In a case where the damping force characteristic formed in such a structure is the soft mode, if a predetermined current is applied to the actuator 15, the area of the first variable orifice Kr is increased to lower a low-speed damping force, and at the same time, the channel of the second variable orifice Kv is closed to lower the pressure of the pilot chamber 45, so that the main valve Km is opened at a low pressure.

In the meantime, in a case where the damping force characteristic is the hard mode, if a high current is applied to the actuator 15, the spool moves upward to close the first variable orifice Kr and open the second variable orifice Kv, thereby increasing the opening pressure of the main valve Km and thus increasing a damping force.

Meanwhile, in the conventional damping force control valve 10 and the shock absorber using the same, when an electric or mechanical trouble causes a system malfunction to occur and thus a current is not input to the damping force control valve 10, the damping force characteristic is fixed to the soft mode. If a steering wheel is excessively turned when the damping force control shock absorber is operated in the soft mode, the vehicle can overturn. In order to solve this problem, it is suggested in U.S. Pat. No. 6,000,508 (Dec. 4, 1999) that a restoring means such as a spring is installed to a general pilot control damping valve and a spool moves by the elasticity of the spring so that a shock absorber can be operated in a middle mode having a damping force in a middle level.

However, in the conventional damping force control valve and the shock absorber using the same, the installation of the restoring means for restoring the spool causes the product size to be increased. In addition, the restoring force of the restoring means is operated even in a normal operation, thereby disturbing rapid control of the damping force. Thus, there is a need for developing a shock absorber capable of controlling a damping force in a middle mode without installing any additional restoring means to the shock absorber.

BRIEF SUMMARY OF THE INVENTION

In one embodiment of the present invention provides a damping force control valve, which has an improved inner channel so that a damping force is operated in a middle mode when an electric or mechanical trouble causes a shock absorber to be out of order or malfunction, and a shock absorber using the same.

According to an aspect of the present invention, there is provided a damping force control valve, which includes a high pressure region in communication with a tension chamber of a cylinder and a low pressure region in communication with a reservoir chamber, and controls a damping force by adjusting pressure of a pilot chamber by first and second variable orifices, the first and second variable orifices having channels controlled to open or close by a spool. The damping force control valve comprises a main valve opened or closed according to pressure of the high pressure region, initial preload and pressure of the pilot chamber, the main valve allowing working fluid to flow from the high pressure region to the low pressure region when being opened; a first fixed orifice formed between the high pressure region and the first variable orifice; and a back pressure forming channel for making the first fixed orifice and the pilot chamber communicate with each other and controlling the pressure of the pilot chamber when the spool closes a channel connecting the high pressure region and the pilot chamber.

Here, the back pressure forming channel preferably includes a first safe orifice formed in the spool and connected to the first fixed orifice, and a second safe orifice connected to the pilot chamber. In addition, the back pressure forming channel may be open when a current supplied to an actuator for operating the spool is intercepted, thereby generating a middle damping force in the pilot chamber.

In addition, according to another aspect of the present invention, there is provided a shock absorber, to which the aforementioned damping force control valve is installed to control a damping force.

BRIEF DESCRIPTION OF THE DRAWINGS

The above and other objects, features and advantages of the present invention will become apparent from the following description of a preferred embodiment given in conjunction with the accompanying drawings, in which.

DETAILED DESCRIPTION OF THE PREFERRED EMBODIMENT

Hereinafter, a preferred embodiment of the present invention will be described in detail with reference to the accompanying drawings.

Figure 1:
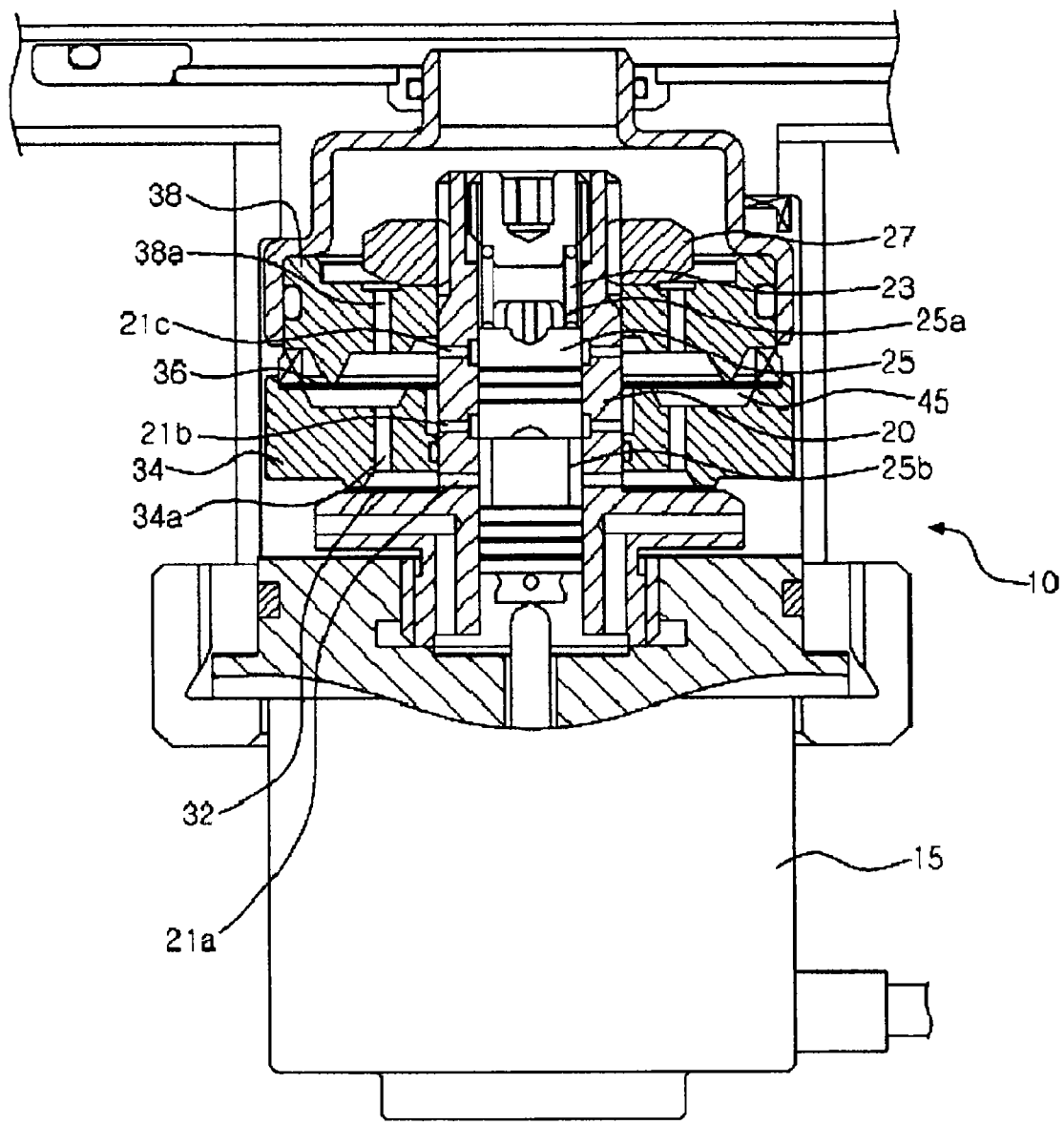
FIG. 1 is a sectional view showing a conventional damping force control valve of a shock absorber.
Figure 2:
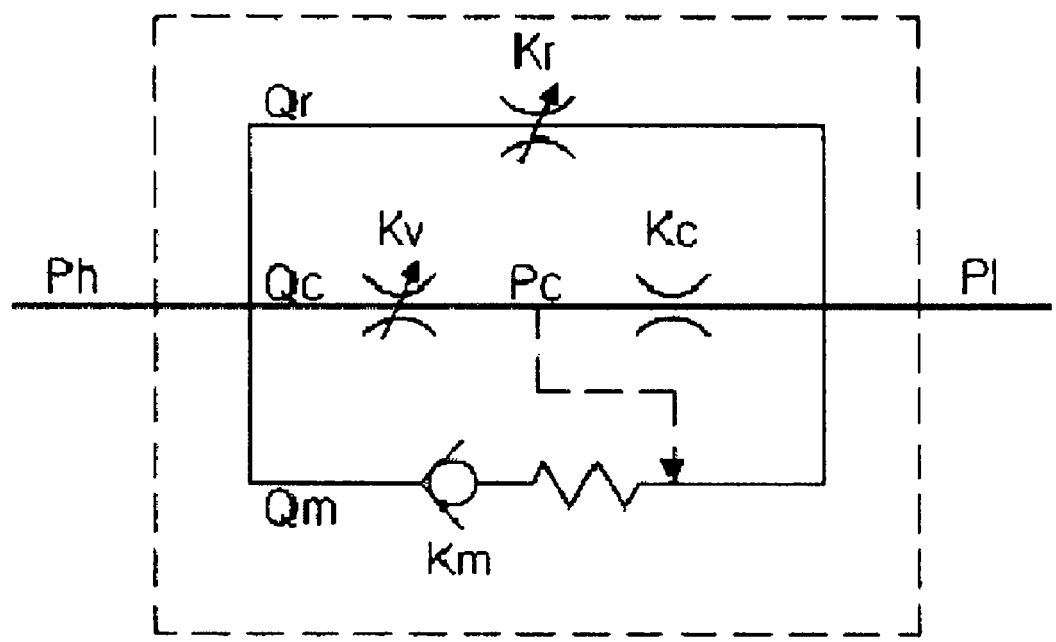
FIG. 2 is a schematic hydraulic circuit diagram showing a channel in the conventional damping force control valve.
Figure 3:
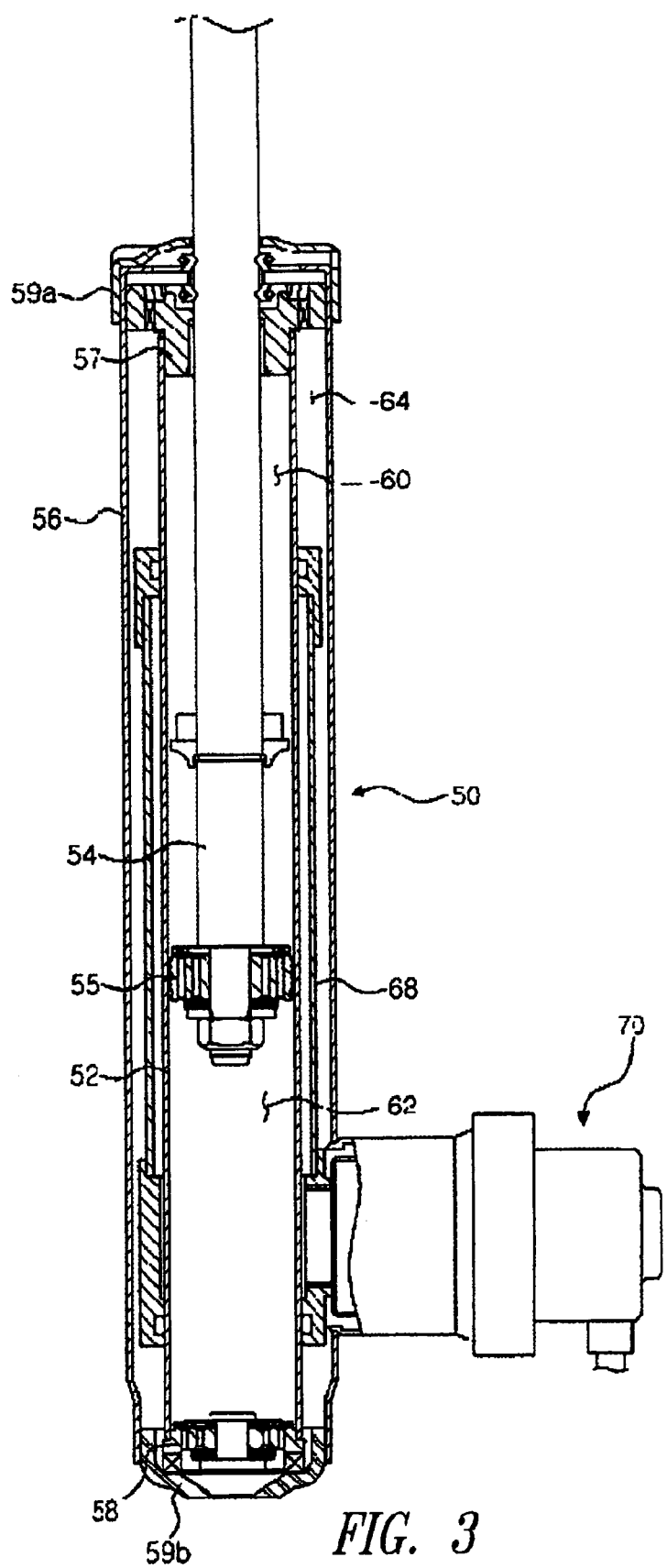
FIG. 3 is a sectional view showing a shock absorber having a damping force control valve according to the present invention.

FIG. 3 is a sectional view showing a shock absorber having a damping force control valve according to the present invention.

As shown in FIG. 3, a shock absorber 50 according to the present invention includes a cylinder 52 which is formed to have predetermined length and diameter and of which the lower end is connected to an axle, and a piston rod 54 which is installed to be linearly movable in the cylinder 52.

Here, the cylinder 52 is filled with working fluid such as gas or oil, and a base shell 56 is arranged in its outside. Meanwhile, a rod guide 57 and a body valve 58 are respectively installed to an upper end of the cylinder 52 and a lower end of the base shell 56. In addition, a piston valve 55 for partitioning the inner space of the cylinder 52 into a tension chamber 60 and a compression chamber 62 is coupled to the lower end of the piston rod 54 to be capable of reciprocating. Also, an upper cap 59a and a base cap 59b are respectively installed to upper and lower portions of the base shell 56.

In addition, a reservoir chamber 64 for compensating the volume change in the cylinder 52 according to the vertical movement of the piston rod 54 is formed between the cylinder 52 and the base shell 56, and the reservoir chamber 64 controls the fluid communication with the compression chamber 62 by means of the body valve 58.

Meanwhile, the shock absorber 50 has a damping force control valve 70 installed to one side of the base shell 56 so as to control a damping force. In addition, the shock absorber 50 includes an intermediate tube 68 installed between the cylinder 52 and the base shell 56 to be connected to the compression chamber 62 of the cylinder 52. Also, the damping force control valve 70 has a high pressure region Ph in communication with the tension chamber 60 of the cylinder 52 through the intermediate tube 68, and a low pressure region Pl in communication with the reservoir chamber 64.

Figure 4:
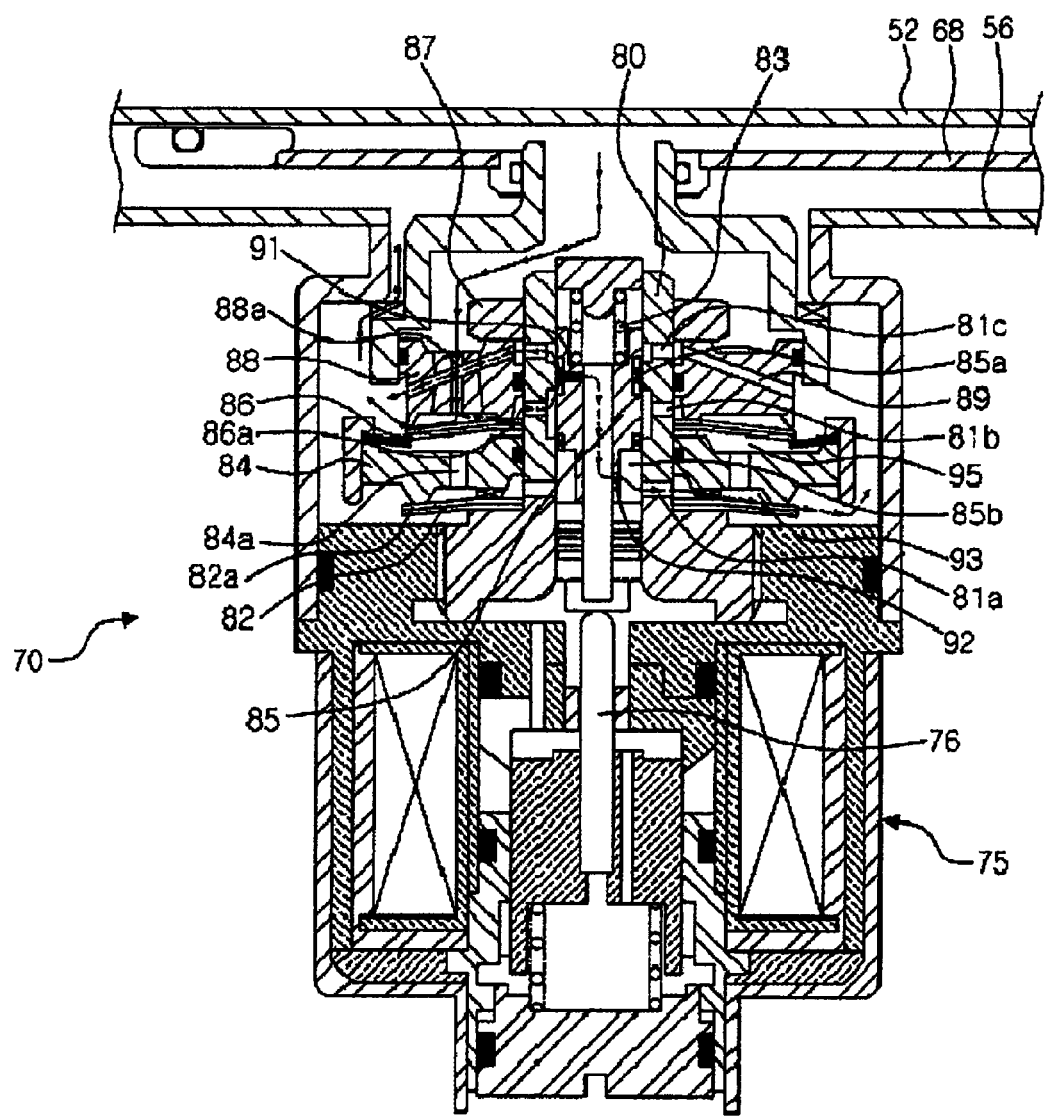
FIGS. 4 to 6 are views showing the operating state of the damping force control valve according to the present invention.
Figure 5:
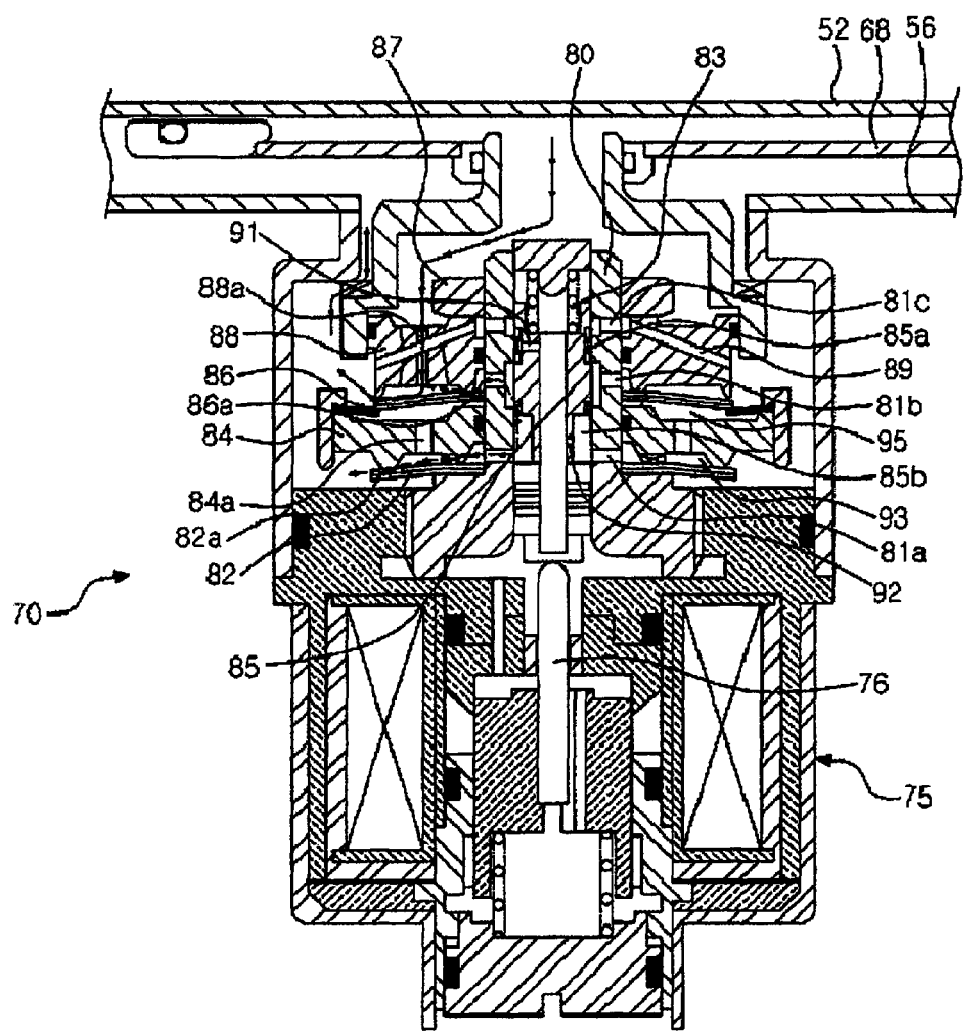
Figure 6:
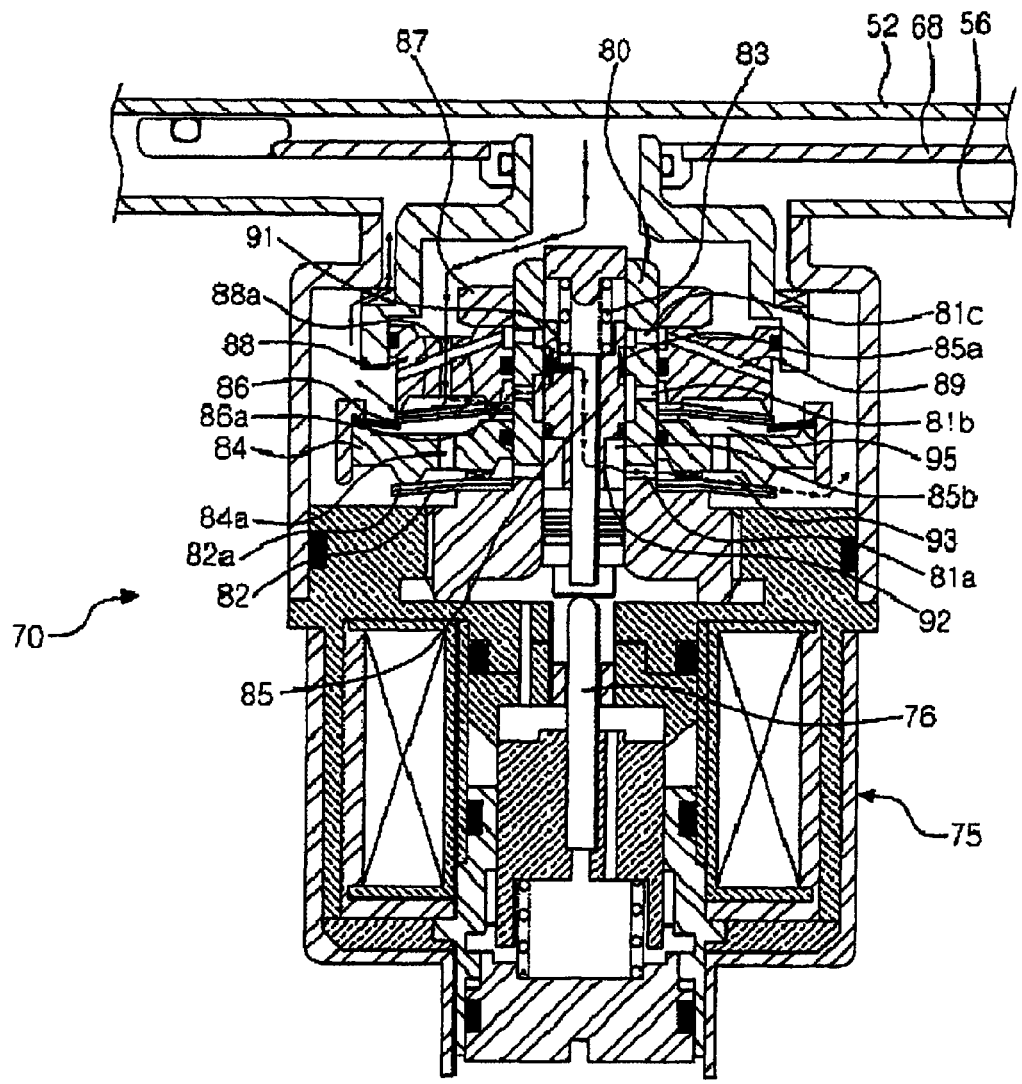
Figure 7:
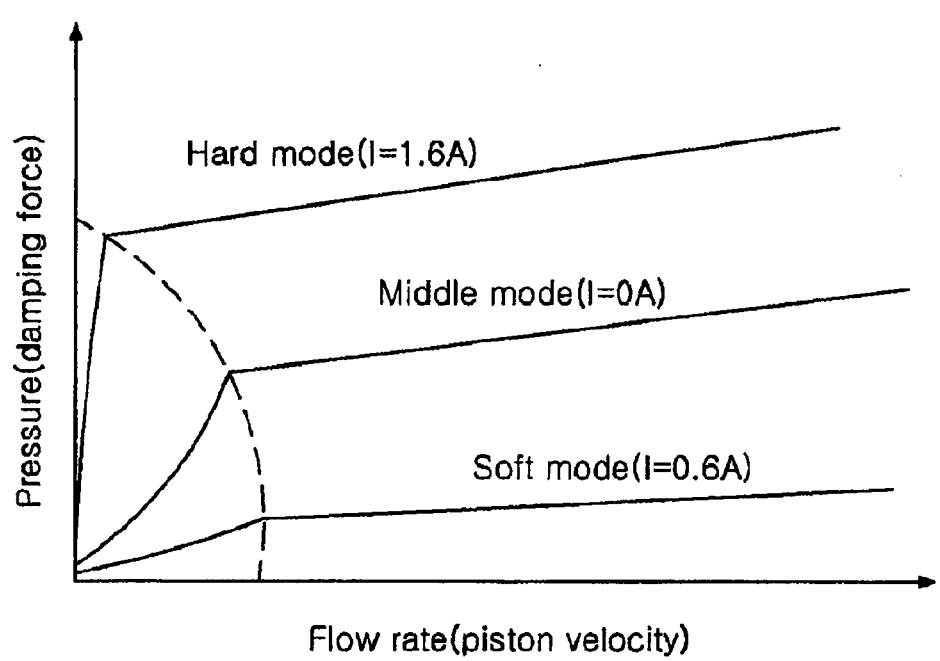
FIG. 7 is a graph showing a damping force characteristic of the damping force control valve according to the present invention.

FIGS. 4 to 6 are views showing the operating state of the damping force control valve according to the present invention, and FIG. 7 is a graph showing a damping force characteristic of the damping force control valve according to the present invention. Referring to the figures, the damping force control valve will be described below.

The above damping force control valve 70 has a plurality of channels therein and a spool 85 arranged on the same axis as a pressing rod 76 of an actuator 75 to be linearly movable in cooperation with the pressing rod 76. The spool 85, which is to move along a spool rod 80, has one end in contact with the pressing rod 76 and the other end elastically supported by a compression spring 83. Thus, the spool 85 moves forward by means of the press of the pressing rod 76, and moves back by means of a restoring force of the compression spring 83. According to this embodiment, the actuator 75 moves the pressing rod 76 according to an input current value. That is, the actuator 75 changes the channels to set a damping force characteristic in a soft mode when a relatively low current value (e.g., 0.6A) is applied thereto and in a hard mode when a relatively high current (e.g., 1.6A) is applied thereto.

Also, the spool rod 80 is formed in its center with a hollow portion into which the spool 85 is to be inserted, and is formed with a plurality of ports 81a, 81b and 81c in a radial direction so that the hollow portion of the spool rod 80 is connected to the outside thereof. In addition, the spool 85 has a plurality of stepped outer diameters in a vertical direction, in the upper portion of which an upper spool slit 85a connected to the hollow portion of the spool rod 80 is formed, and in the lower portion of which a lower spool slit 85b is formed. Also, the spool 85 defines the inner channels by means of the interaction with the spool rod 80, so that the upper spool slit 85a or the lower spool slit 85b communicates with the communication ports 81a, 81b or 81c.

As mentioned above, only one actuator 75 is sufficient to control the spool 85, and the spool 85 is actuated by the actuator 75 to control a first variable orifice Kvr and a second variable orifice Kcr formed by the communication ports of the spool rod 80 and the spool 85. Also, a first ring disk 82 is fitted around the spool rod 80, and a lower retainer 84 is coupled to an upper portion of the spool rod 80 to fix the first ring disk 82. In addition, an inflow chamber 93 controlled by the first ring disk 82 is defined in a lower portion of the lower retainer 84, and a pilot chamber 95 is defined in an upper portion thereof. Also, a communication port 84a for allowing the fluid flow between the inflow chamber 93 and the pilot chamber 95 is formed in the lower retainer 84.

In addition, a plurality of slits 82a are formed in the circumference of the first ring disk 82, and a second fixed orifice Kc is formed in the first ring disk 82 so as to regularly discharge the fluid of the pilot chamber 95 through the slits 82a. Here, the first ring disk 82 may be formed of a membrane having a disk shape.

The second fixed orifice Kc communicates with a first fixed orifice Kr when the second variable orifice Kcr communicating with the pilot chamber 95 is opened. The second fixed orifice Kc controls the working fluid discharged to the low pressure region Pl so that the working fluid supplied through the second variable orifice Kcr controls the pressure of the pilot chamber 95.

In addition, a second ring disk 86, which is inserted into the spool rod 80 to function as a main valve Km, is arranged in an upper portion of the lower retainer 84, and the second ring disk 86 partitions the pilot chamber 95 from a high pressure region Ph.

Here, the second ring disk 86 is integrally formed, and preferably comprises a membrane having a disk shape.

Thus, the pressure of the pilot chamber 95 is controlled by means of the first ring disk 82, the second ring disk 86 that is the main valve Km is controlled to open or close according to the pressure of the high pressure region Ph and initial preload, and the working fluid is allowed to directly flow from the high pressure region Ph to the low pressure region Pl.

In addition, a plurality of slits 86a are formed in the inner circumference of the second ring disk 86, and the first fixed orifice Kr for discharging the fluid introduced from the high pressure region Ph is formed therein.

Meanwhile, the fluid introduced into the first fixed orifice Kr of the second ring disk 86 is introduced into the first variable orifice Kvr or the second variable orifice Kcr that is formed by means of the spool 85 actuated by the actuator 75 and the communication ports 81a, 81b and 81c of the spool rod 80. At this time, the cross sectional area of the second variable orifice Kcr is decreased as that of the first variable orifice Kvr is increased, while the cross sectional area of the second variable orifice Kcr is increased as that of the first variable orifice Kvr is decreased.

Also, a nut 87 is coupled to the spool rod 80, thereby joining the lower retainer 84 and an upper retainer 88.

In addition, the upper retainer 88 formed with a communication port 88a allowing fluid flow is coupled to the spool rod 80, thus fixing the second ring disk 86. The upper retainer 88 has a bypass channel 89, which is formed to allow the interior of the hollow spool rod 80 to communicate with the low pressure region Pl.

Meanwhile, the spool 85 has a hollow portion formed therein, and its one side (an upper side in the figure) is open. In addition, the spool 85 is formed with a first safe orifice 91, $F_{S1}$, which communicates with the hollow portion of the spool 85 and an upper one side of the upper spool slit 85a, and a second safe orifice 92, $F_{S2}$, which communicates with the hollow portion and the lower spool slit 85b. As mentioned above, the channel defined by the first safe orifice 91, $F_{S1}$, the hollow portion and the second safe orifice 92, $F_{S2}$, forms a back pressure forming channel and controls the pressure of the pilot chamber 95.

As described above, the pilot chamber 95 is changed in inner pressure as the open areas of the first variable orifice Kvr and the second variable orifice Kcr are changed by the spool 85 that is operated by the actuator 75, thereby forming a back pressure against the second ring disk 86 at the rear thereof. Thus, the pressure change in the pilot chamber 95, i.e., the back pressure change against the second ring disk 86, or the main valve Km, makes the second ring disk 86 control a drag force against the fluid passing through the first variable orifice Kvr, thereby providing a controlled damping force to the shock absorber 50.

The operation of the damping force control valve configured as mentioned above will be described below.

First, when a relatively low current (e.g., 0.6 A) is applied to the actuator 75, as shown in FIG. 4, the operating rod of the actuator 75 slightly moves the spool 85 forward or backward and makes the first fixed orifice Kr and the first variable orifice Kvr communicate with each other. At this time, most of the fluid introduced from the high pressure region Ph is introduced into the spool slit 85a of the spool rod 80 through the first fixed orifice Kr, the communication port and the first variable orifice Kvr, and then discharged to the low pressure region Pl through the bypass channel 89.

In addition, a portion of the fluid introduced to the upper spool slit 85a is supplied to the low spool slit 85b through the back pressure forming channel that connects the first safe orifice 91, $F_{S1}$, and the second safe orifice 92, $F_{S2}$. Also, the portion of the fluid supplied to the low spool slit 85b is introduced into the pilot chamber 95 to increase its inner pressure, thereby controlling an opening/closing pressure of the second ring disk 86. In addition, the other portion of the fluid introduced through the low spool slit 85b is discharged to the low pressure region Pl through the second fixed orifice Kc.

During the above process, most of the fluid is discharged through the bypass channel 89, whereby a damping force characteristic is controlled to be in a soft mode.

Meanwhile, if a relatively high current (e.g., 1.6 A) is applied to the actuator 75, as shown in FIG. 5, the operating rod of the actuator 75 moves the spool 85 forward, so that the first variable orifice Kvr is closed and the first fixed orifice Kr and the second variable orifice Kcr communicate with each other.

At this time, a portion of the fluid introduced from the high pressure region Ph opens the second ring disk 86 and is discharged to the low pressure region Pl, and the other portion of the fluid is supplied to the low spool slit 85b of the spool rod 80 through the first fixed orifice Kr, the communication port and the second variable orifice Kcr. In addition, a portion of the other partial fluid introduced through the low spool slit 85b is introduced to the pilot chamber 95 to increase an opening/closing pressure of the second ring disk 86, thereby controlling an opening/closing pressure of the second ring disk 86. Also, the remainder of the other partial fluid introduced through the low spool slit 85b is discharged to the low pressure region Pl through the second fixed orifice Kc formed in the first ring disk 82.

Thus, the fluid introduced from the high pressure region Ph is directly discharged to the low pressure region Pl through the main valve Km including the second ring disk 86 and the second fixed orifice Kc, and during this process, the damping force characteristic is controlled to be in a hard mode.

In the meantime, FIG. 6 shows a case where a power supplied to the actuator 75 is abruptly intercepted or malfunctions, at which the spool 85 is completely moved backward to close the first variable orifice Kvr and the second variable orifice Kcr.

At this time, a portion of the fluid introduced from the high pressure region Ph opens the second ring disk 86 and is discharged to the low pressure region Pl, and the other portion of the fluid is supplied to the upper spool slit 85a through the first fixed orifice Kr and the communication port 81b. In addition, the other portion of the fluid is supplied to the hollow portion of the spool 85 through the first safe orifice 91, $F_{S1}$, formed in the spool 85, and then supplied to the low spool slit 85b through the second safe orifice 92, $F_{S12}$. Also, the fluid in the low spool slit 85b is partially introduced into the pilot chamber 95 through the communication port 81a to increase an opening/closing pressure of the second ring disk 86, thereby controlling the pressure of the main valve Km. In addition, the remainder of the fluid introduced through the low spool slit 85b is discharged to the low pressure region Pl through the second fixed orifice Kc formed in the first ring disk 82.

Thus, the fluid introduced from the high pressure region Ph is directly discharged to the main valve Km including the second ring disk 86, and increases the pressure of the pilot chamber 95 in the process of discharging the fluid to the low pressure region Pl by the back pressure formation channel, so that the damping force characteristic is controlled to be in a middle mode.

Figure 8:
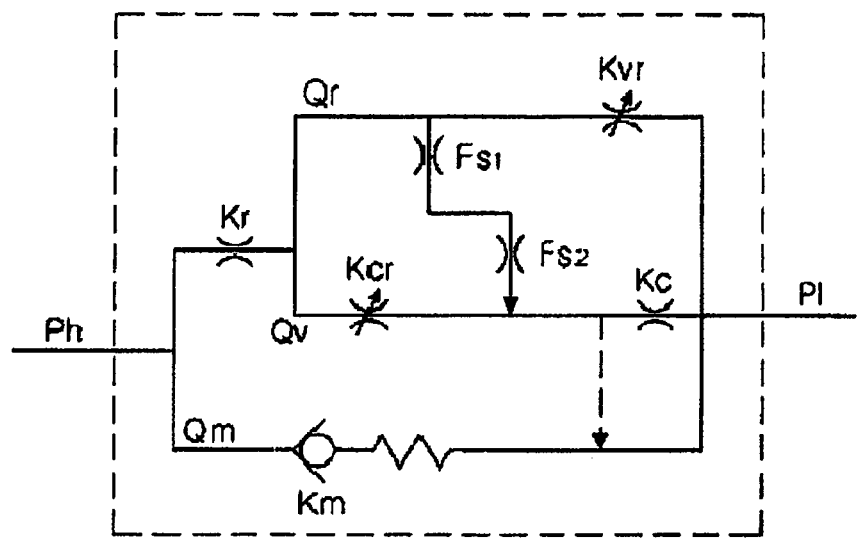
FIG. 8 is a schematic hydraulic circuit diagram showing a channel in the damping force control valve according to the present invention.

FIG. 8 is a schematic hydraulic circuit diagram showing a channel in the damping force control valve according to the present invention. Referring the figure, the operation of the damping force control valve so configured according to the present invention will be explained below.

The damping force control valve 70 according to the present invention includes three channels, as shown in FIG. 8, so that different damping force characteristics are shown by means of the fluid passing through each channel. At this time, the three channels formed in the damping force control valve 70 include a first channel Qm having the main valve Km, a second channel Qr having the first fixed orifice Kr, the first variable orifice Kvr and the back pressure forming channel that connects the first fixed orifice Kr to a position between the second variable orifice Kcr and the second fixed orifice Kc, and a third channel Qv having the first fixed orifice Kr, the second variable orifice Kcr and the second fixed orifice Kc.

The first channel Qm is opened or closed by the main valve Km, and the main valve Km is controlled to open or close according to the pressure of the pilot chamber 95 and the initial preload, which is formed by the operating pressure of the high pressure region Ph, the spring 83 and the like.

In addition, the fluid introduced from the high pressure region Ph is supplied through the first fixed orifice Kr, and supplied to the second channel Qr or the third channel Qv defined when the spool 85 moves forward or backward.

The second channel Qr further includes the first fixed orifice Kr communicating with the high pressure region Ph, and the first variable orifice Kvr making the first fixed orifice and the low pressure region Pl communicate with each other. The fluid supplied through the first fixed orifice Kr is introduced into the first variable orifice Kvr and then discharged to the low pressure region Pl through the bypass channel 89.

Meanwhile, the back pressure forming channel formed in the second channel Qr is connected to a position between the first fixed orifice Kr and the first variable orifice Kvr and a position between the second variable orifice and the second fixed orifice Kc of the third channel Qv, thereby supplying a portion of fluid to the pilot chamber 95. Thus, the pressure of the pilot chamber 95 is increased, and the damping force characteristic is controlled to be in a middle mode.

In the meantime, the third channel Qv has the second variable orifice Kcr making the first fixed orifice Kr and the pilot chamber 95 communicate with each other, and the second fixed orifice Kc making the pilot chamber 95 and the low pressure region Pl communicate with each other. Also, the third channel Qv communicates with the low pressure region Pl when the first fixed orifice Kr, the second variable orifice Kcr and the second fixed orifice Kc are opened, and a portion of the fluid supplied to the third channel Qv is supplied to the pilot chamber 95 to control the opening/closing of the main valve Km. At this time, in case a lot of fluid is supplied through the second variable orifice Kcr, if the amount of fluid supplied to the pilot chamber 95 is increased, the pressure of the main valve Km is increased to reduce an amount of fluid passing through the first channel Qm. Meanwhile, in a case where an amount of fluid supplied through the second variable orifice Kcr is small, if the amount of fluid supplied to the pilot chamber 95 is reduced, the pressure of the main valve Km is decreased to increase an amount of fluid passing through the first channel Qm.

Thus, the first fixed orifice Kr is installed at the inlet of the second variable orifice Kcr and the first variable orifice Kvr to primarily control an amount of fluid supplied to the second channel Qr and the third channel Qc.

In a case where the damping force characteristic formed in such a structure is a soft mode, the area of the first variable orifice Kvr is increased to lower a low-speed damping force, and at the same time, the channel of the second variable orifice Kcr is closed to lower the pressure of the pilot chamber 45, thereby making the main valve Km be opened at a low pressure.

In addition, when the damping force characteristic is a hard mode, the first variable orifice Kvr is closed and the second variable orifice Kcr is opened contrary to the soft mode, thereby increasing the opening pressure of the main valve Km and thus increasing a damping force.

Meanwhile, when an emergency state where a current is not supplied to the actuator 75, the first variable orifice Kvr and the second variable orifice Kcr are closed and the back pressure forming channel connected to the pilot chamber 95 is open, thereby increasing a damping force at a predetermined level. Accordingly, the damping force control valve has a damping force characteristic in a middle mode when no current is supplied.

Thus, even when the damping force control valve 70 of the shock absorber 50 gets out of order, the damping force characteristic is kept in the middle mode even though a steering wheel is excessively turned, so that it is possible to prevent deterioration of handling stability when the shock absorber 50 is operated only with the soft damping force.

According to the damping force control valve and the shock absorber using the same configured as mentioned above according to the present invention, the back pressure forming path in the pilot chamber is variously changed, and thus a damping force can be maintained so that the handling stability of a vehicle can be secured even though the shock absorber is out of order or malfunction due to an electric or mechanical problem of the actuator.

Although the damping force control valve and the shock absorber using the same according to the present invention have been described with the accompanying drawings, the present invention is not limited to the embodiment and drawings. It will be apparent that those skilled in the art can make various modifications and changes thereto within the scope of the invention defined by the claims.

Thus, from the foregoing it will be appreciated that, although specific embodiments of the invention have been described herein for purposes of illustration, various modifications may be made without deviating from the spirit and scope of the invention. Accordingly, the invention is not limited except as by the appended claims.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

The invention claimed is:

1. A damping force control valve, which includes a high pressure region in communication with a tension chamber of a cylinder and a low pressure region in communication with a reservoir chamber, and controls a damping force by adjusting pressure of a pilot chamber by first and second variable orifices, the first and second variable orifices having channels controlled to open or close by a spool, the damping force control valve comprising:

a main valve opened or closed according to pressure of the high pressure region, initial preload and pressure of the pilot chamber, the main valve allowing working fluid to flow from the high pressure region to the low pressure region when being opened;

a first fixed orifice formed between the high pressure region and the first variable orifice; and a back pressure forming channel for making the first fixed orifice and the pilot chamber communicate with each other and controlling the pressure of the pilot chamber when the spool closes a channel connecting the high pressure region and the pilot chamber, the back pressure forming channel including a first safe orifice formed in the spool and connected to the first fixed orifice, and a second safe orifice connected to the pilot chamber.

2. A shock absorber, to which the damping force control valve according to claim 1 is installed to control a damping force.

3. A damping force control valve, which includes a high pressure region in communication with a tension chamber of a cylinder and a low pressure region in communication with a reservoir chamber, and controls a damping force by adjusting pressure of a pilot chamber by first and second variable orifices, the first and second variable orifices having channels controlled to open or close by a spool, the damping force control valve comprising:

a main valve opened or closed according to pressure of the high pressure region, initial preload and pressure of the pilot chamber, the main valve allowing working fluid to flow from the high pressure region to the low pressure region when being opened;

a first fixed orifice formed between the high pressure region and the first variable orifice; and a back pressure forming channel for making the first fixed orifice and the pilot chamber communicate with each other and controlling the pressure of the pilot chamber when the spool closes a channel connecting the high pressure region and the pilot chamber, and wherein the back pressure forming channel is open when a current supplied to an actuator for operating the spool is intercepted, thereby generating a middle damping force in the pilot chamber.

4. A shock absorber, to which the damping force control valve according to claim 3 is installed to control a damping force.

* * * * *